United States Patent
Shahinpoor et al.

[11] Patent Number: 5,735,607
[45] Date of Patent: Apr. 7, 1998

[54] SHAPE MEMORY ALLOY THAW SENSORS

[75] Inventors: Mohsen Shahinpoor; David R. Martinez, both of Albuquerque, N. Mex.

[73] Assignee: Sandia Corporation, Albuquerque, N. Mex.

[21] Appl. No.: 567,683

[22] Filed: Dec. 5, 1995

[51] Int. Cl.$^6$ .................................... G01K 5/48
[52] U.S. Cl. ................ 374/187; 374/106; 116/216; 426/88
[58] Field of Search ................... 374/104, 106, 374/187, 194, 195, 205; 116/216, 218, 221, 281, 282, 283, 284; 426/88

[56] References Cited

U.S. PATENT DOCUMENTS

| | | | |
|---|---|---|---|
| 1,695,827 | 12/1928 | Sipe | 116/221 |
| 1,712,246 | 5/1929 | Boyce | 116/216 |
| 2,753,270 | 7/1956 | Di Renzo | 116/216 |
| 3,290,942 | 12/1966 | Carbaugh et al. | 116/221 |
| 4,091,763 | 5/1978 | Snider | 116/221 |
| 4,649,854 | 3/1987 | Janke et al. | 116/221 |
| 5,076,197 | 12/1991 | Darringer et al. | 374/187 |
| 5,335,994 | 8/1994 | Weynant Nee Girones | 374/106 |

FOREIGN PATENT DOCUMENTS

| | | | |
|---|---|---|---|
| 2664383 | 1/1992 | France | 116/216 |

*Primary Examiner*—G. Bradley Bennett
*Attorney, Agent, or Firm*—Timothy D. Stanley

[57] ABSTRACT

A sensor permanently indicates that it has been exposed to temperatures exceeding a critical temperature for a predetermined time period. An element of the sensor made from shape memory alloy changes shape when exposed, even temporarily, to temperatures above the Austenitic temperature of the shape memory alloy. The shape change of the SMA element causes the sensor to change between two readily distinguishable states.

14 Claims, 3 Drawing Sheets

SHAPE MEMORY ALLOY THAW SENSORS

This invention was made with Government support under Contract DE-AC04-94AL85000 awarded by the U.S. Department of Energy. The Government has certain rights in the invention.

BACKGROUND OF THE INVENTION

This invention relates to temperature sensors, specifically shape memory alloy temperature sensors that provide persistent indication once their temperature reaches a critical value.

Exposure to temperatures above a critical temperature can damage many important materials. Food products such as frozen dairy products and frozen meats can spoil when exposed to thawing temperatures for even a short time. Frozen medical products such as blood and certain pharmaceuticals can be unsafe once exposed to thawing or other high temperatures, even if the temperature later returns to a safe value. Low temperatures can also compromise important properties of some rubber and rubber-like materials. The damage is often unseen, and can persist even if the temperature returns to an acceptable level. This situation can arise in transportation, where a frozen product temporarily experiences high temperatures due to improper handling or cooling equipment malfunction.

Conventional temperature sensors can not permanently indicate temporary temperature deviations. Conventional temperature sensors, such as common thermometers, indicate the current temperature only. They provide a continuous indication of the current temperature of the material. They do not provide a permanent indication of out-of-range temperatures without additional permanent recording apparatus. Accordingly, there is a need for sensors that permanently indicate temporary out-of-range temperatures.

Shape memory alloys (SMAs) have properties that might be useful in developing the needed sensors. An SMA has a certain shape at temperatures below the SMA's Austenitic temperature. The SMA moves in a certain fashion to a second shape when the temperature rises above the Austenitic temperature. The SMA will not return to the initial shape without additional external force even if the temperature subsequently falls below the Austenitic temperature. SMAs are used in a variety of applications, such as those described in "Design and Modeling of a Novel Fibrous SMA Actuator," Proc. SPIE Smart Materials and Structures Conference, vol. 2190, pp. 730–738 (1994), and "A Phenomenological Description of Thermodynamical Behavior of Shape Memory Alloys," Transactions of the ASME, J. Appl. Mech., vol. 112, pp. 158–163 (1990).

SUMMARY OF THE INVENTION

An object of the present invention is to provide a sensor capable of sensing an object's temperature and providing a persistent indication of out-of-range temperatures.

Another object of the present invention is to provide a sensor that permanently indicates temporary temperature variations that exceed a critical temperature.

A further object of the present invention is to provide a sensor that monitors an object's temperature and displays a permanent change if the temperature reaches a critical value.

Additional objects, advantages, and novel features will become apparent to those skilled in the art upon examination of the following description or may be learned by practice of the invention. The objects and advantages of the invention may be realized and attained by means of the instrumentalities and combinations particularly pointed out in the appended claims.

This invention senses the temperature of an object and provides a lasting indication of temporary temperature variations. SMA elements change shape at their Austenitic temperature, and will not return to their original shape in the Martensitic phase if the temperature returns to the original value. The invention uses SMA elements to permanently indicate temporary temperature variations that are beyond the critical temperature of the SMA.

One embodiment of the invention uses an SMA spring or bellows. In its low temperature state, the bellows supports a green surface that conceals a red indicator surface. The bellows or spring contracts when the temperature reaches the Austenitic temperature, rupturing the green surface and revealing the red indicator surface. Since the SMA element will not return to its original shape, even a temporary exposure to excessive temperature will cause the sensor to permanently indicate an out-of-range temperature.

Another embodiment uses the SMA element itself to obscure a red indicator surface. The element curls away from the red indicator surface when exposed to high temperature. The indicator surface can be chosen to contrast with the surface of the SMA element so that the high temperature state is readily distinguished from the low temperature state.

Other embodiments of the invention use indicator elements that rotate about an axis. The rotation of the indicators exposes surfaces. The surfaces can be chosen so that the sensor with exposed surfaces is readily distinguishable from the sensor with the surfaces unexposed. SMA elements can be connected to the ends of the indicators so that changes in the length of the SMA elements cause the indicators to rotate. SMA elements can also be used to pin the indicators to a base so that relative rotation of the ends of the SMA elements causes the indicators to rotate.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

Figure 1A:
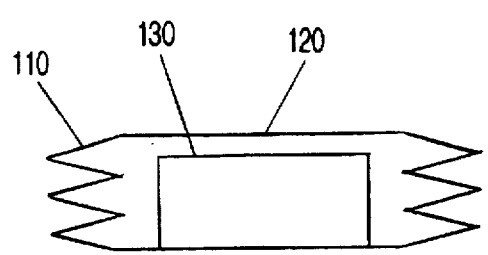
FIG. 1 is a sectional view of one embodiment of the invention.
Figure 1B:
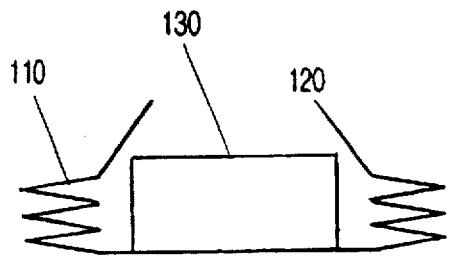

FIG. 1 shows one embodiment of the current invention. A bellows 110 of SMA or spring 110 surrounds a first surface 130. An SMA spring would be suitable in place of the SMA bellows. A second surface 120 is mounted with the bellows 110. In FIG. 1(a), the bellows 110 is in its low temperature state, where the second surface 120 conceals the first surface 130. In FIG. 1(b), the bellows 110 has contracted to its high temperature state. As the bellows 120 contracts it ruptures the second surface 120, exposing the first surface 130. Since the SMA will not return to its low temperature state even if the temperature drops below the SMA's critical temperature, the first surface will remain exposed even if the sensor later experiences higher or lower temperatures. The two surfaces can be chosen to contrast in various ways. For example, red and green colored surfaces could allow visual detection. Metallic and non-metallic surfaces could allow electrical monitoring.

Figure 2A:
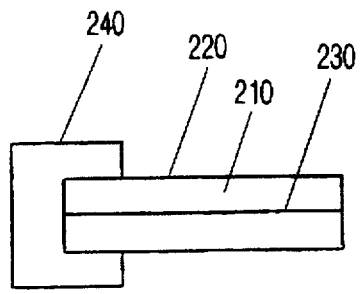
FIG. 2 is a side view of another embodiment of the invention.
Figure 2B:
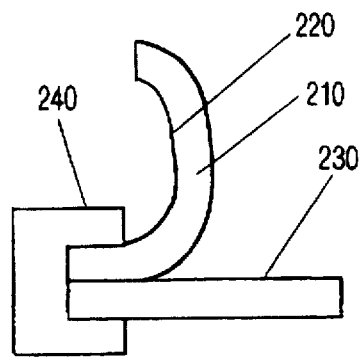

FIG. 2 shows another embodiment of the present invention. A substantially planar element 210 formed of SMA overlays a first surface 230. The top of the SMA element 210 is a second surface 220. A bracket 240 can fix one end of the SMA element 210 to the second surface 230. FIG. 2(a) shows the sensor with the SMA element 210 in its low temperature shape. The SMA element 210 obscures the first surface 230. FIG. 2(b) shows the sensor with the SMA element 210 in its high temperature state. The SMA element 210 has curled away from the first surface 230, exposing the first surface 230. Since the SMA will not return to its low temperature state even if the temperature drops below the SMA's critical temperature, the first surface will remain exposed if the sensor experiences high temperatures even temporarily. The two surfaces can be chosen to contrast in various ways. For example, red and green colored surfaces could allow visual detection. Metallic and non-metallic surfaces could allow electrical monitoring.

Figure 3A:
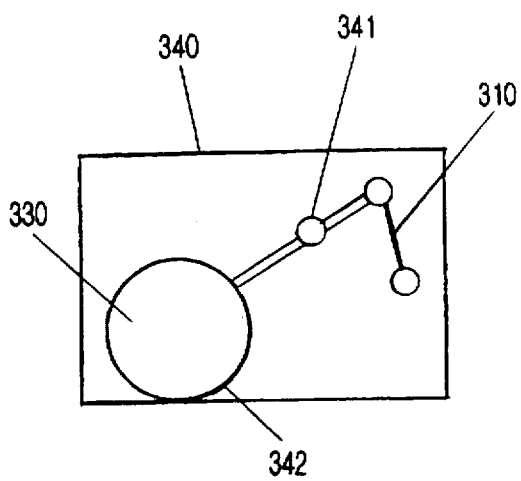
FIG. 3 is a top view of another embodiment of the invention.
Figure 3B:
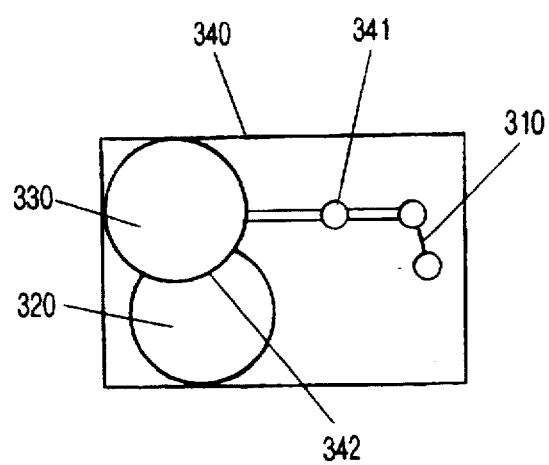

FIG. 3 shows a top view of another embodiment of the present invention. A substantially planar indicator 342 is mounted to a base 340 at an axis 341. An SMA element 310 is mounted to the indicator 342 and to the base 340. One end of the indicator 342 comprises a first surface 330. A second surface 320 is mounted with the base 340. FIG. 3(a) shows the sensor with the SMA element 310 in its low temperature state. The first surface 330 obscures the second surface 320. FIG. 3(b) shows the sensor with the SMA element 310 in its high temperature state. The SMA element 310 has contracted, exerting a torque on the indicator element 342. The first surface 330 no longer obscures the second surface 320 since the indicator element 342 has rotated about the axis 341. Since the SMA will not return to its low temperature state even if the temperature drops below the SMA's critical temperature, the second surface will remain exposed if the sensor later experiences higher or lower temperatures. The two surfaces can be chosen to contrast in various ways. For example, red and green colored surfaces could allow visual detection. Metallic and non-metallic surfaces could allow electrical monitoring.

Figure 4A:
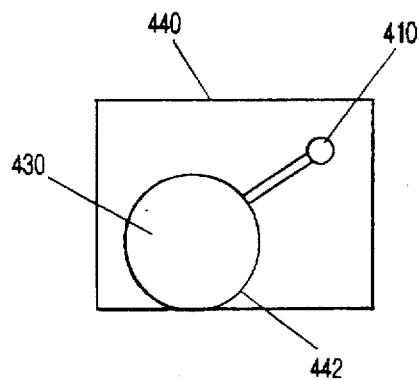
FIG. 4 is a top view of another embodiment of the invention.
Figure 4B:
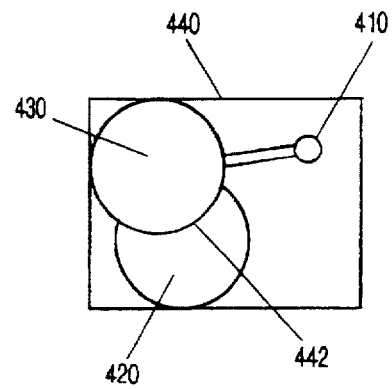

FIG. 4 shows a top view of another embodiment of the present invention. A substantially planar indicator 442 is fixed to an SMA element 410. SMA element 410 comprises a stud whose ends can torsionally rotate relative to each other. The SMA element 410 is also fixed to a base 440. One end of the indicator 442 comprises a first surface 430. A second surface 420 is mounted with the base 440. FIG. 4(a) shows the sensor with the SMA element 410 in its low temperature state. The first surface 430 obscures the second surface 420. FIG. 4(b) shows the sensor with the SMA element 410 in its high temperature state. The ends of the SMA element 410 have rotated relative to each other, exerting a torque on the indicator element 442. The first surface 430 no longer obscures the second surface 420 since the indicator element 442 has rotated relative to the base. Since the SMA will not return to its low temperature state even if the temperature drops below the SMA's critical temperature, the second surface will remain exposed if the sensor later experiences higher or lower temperatures. The two surfaces can be chosen to contrast in various ways. For example, red and green colored surfaces could allow visual detection. Metallic and non-metallic surfaces could allow electrical monitoring.

Figures 5A, 5B:
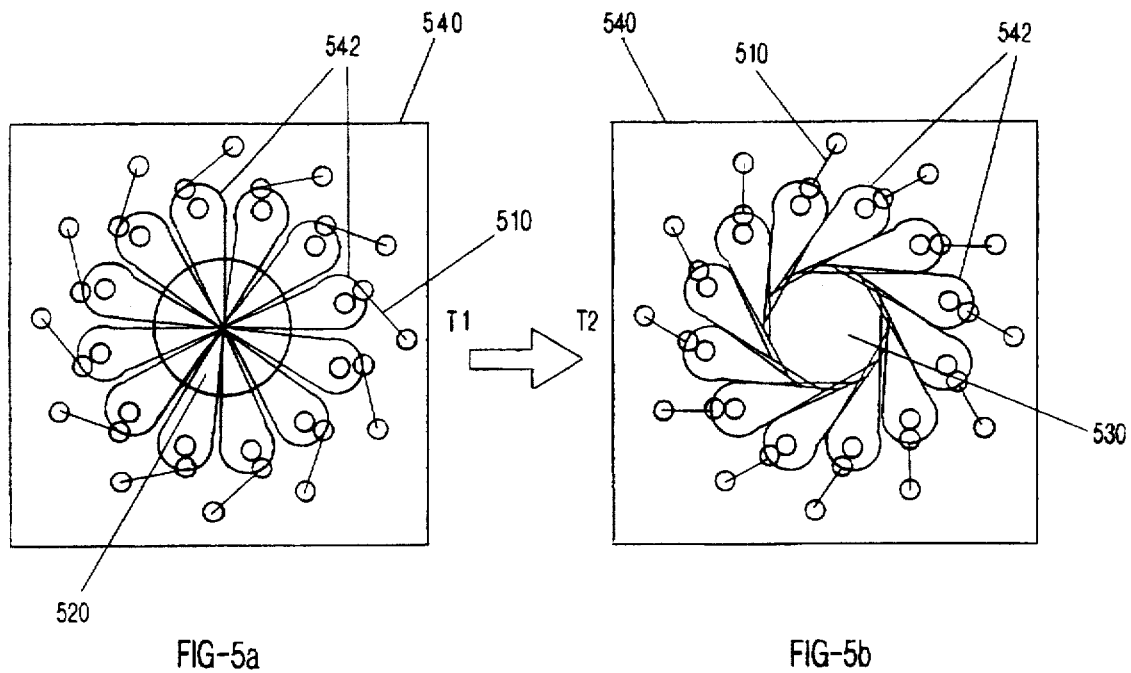
FIG. 5 is a top view of another embodiment of the invention.

FIG. 5 shows a multiple shutter embodiment of the present invention. A plurality of indicators 542 is mounted with a base 540, each at its own axis (e.g., 541). Each indicator is mounted with an SMA element (e.g., 510). Each SMA element 510 is also mounted with the base 540. A first surface 530 is mounted under the indicators 542. The indicator elements together form a second surface 520. FIG. 5(a) shows the sensor with the SMA elements in their low temperature states. The indicators are close together so that together they obscure the first surface 530. FIG. 5(b) shows the sensor with the indicator elements in their high temperature states. Each element 510 has contracted, exerting a torque on the associated indicators 542. The indicators 542 have rotated about their axes 541, exposing the first surface 530. Since the SMA elements 510 will not return to their low temperature states even if the temperature drops below the SMA's critical temperature, the first surface will remain exposed if the sensor later experiences higher or lower temperatures. The two surfaces can be chosen to contrast in various ways. For example, red and green colored surfaces could allow visual detection. Metallic and non-metallic surfaces could allow electrical monitoring.

Figures 6A, 6B:
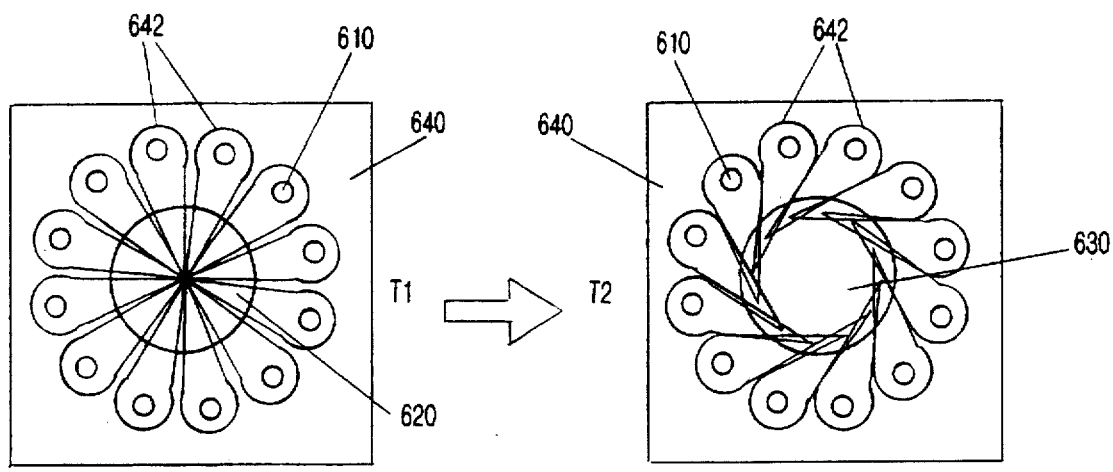
FIG. 6 is a top view of another embodiment of the invention.

FIG. 6 shows a top view of another multiple shutter embodiment of the present invention. A plurality of indicators 642 are fixed to SMA elements 610. SMA elements 610 comprise studs whose ends can torsionally rotate relative to each other. The SMA elements 610 are also fixed to a base 640. A first surface 630 is mounted under the indicators 642. The indicator elements together form a second surface 620. FIG. 6(a) shows the sensor with the SMA elements in their low temperature states. The indicators are close together so that together they obscure the first surface 630. FIG. 6(b) shows the sensor with the indicator elements in their high temperature states. The ends of each element 610 have rotated relative to each other, exerting a torque on the associated indicators 642. The indicators 642 have rotated relative to the base 640, exposing the first surface 630. Since the SMA elements 610 will not return to their low temperature states even if the temperature drops below the SMA's critical temperature, the first surface will remain exposed if the sensor later experiences higher or lower temperatures. The two surfaces can be chosen to contrast in various ways. For example, red and green colored surfaces could allow visual detection. Metallic and non-metallic surfaces could allow electrical monitoring.

Figures 7A, 7B:
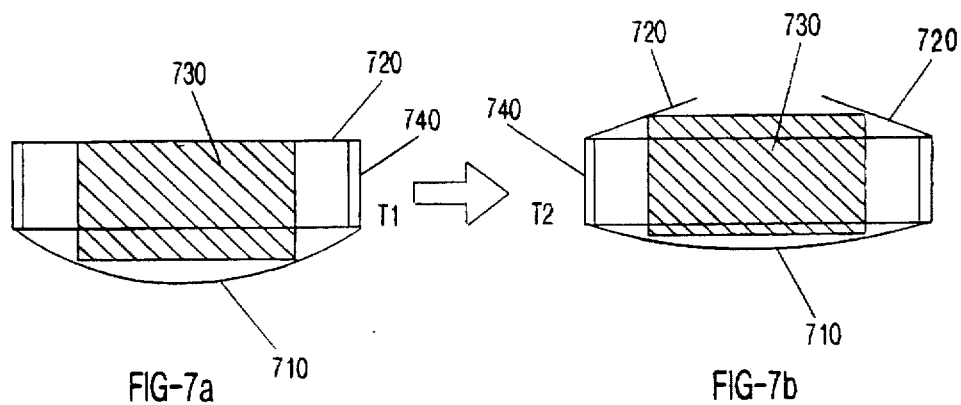
FIG. 7 is a sectional view of another embodiment of the present invention.

FIG. 7 shows a sectional view of another embodiment of the present invention. An enclosure 740 surrounds an indicator 730. An SMA element 710, mounted with the enclosure 740, is opposite a first surface 720. The first surface 720, mounted with the enclosure 740, indicates that the sensor has experienced out of range temperatures. In FIG. 7(b), the SMA element 710 has contracted to its second shape, pushing the indicator 730 against the first surface 720. The rupturing of the first surface 720 allows the indicator 730 to be seen, indicating that the sensor has experienced out of range temperatures.

Figures 8A, 8B:
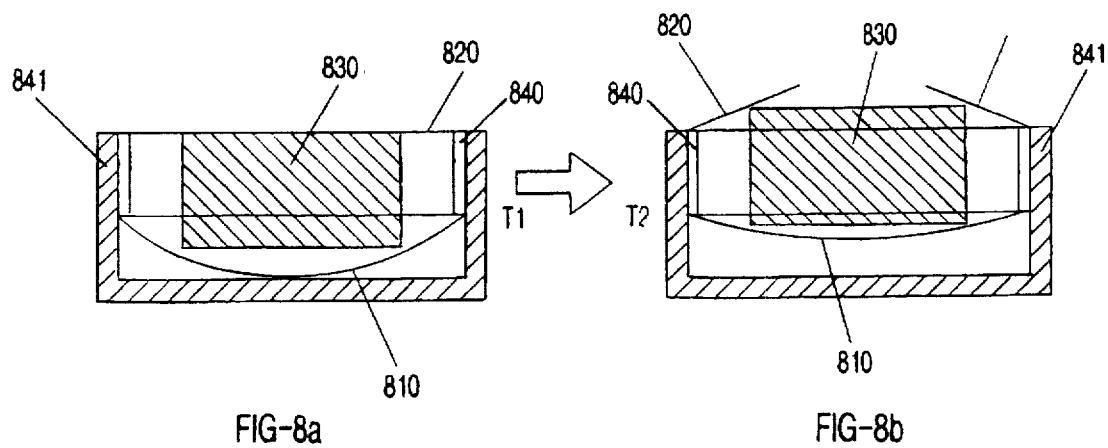
FIG. 8 is a sectional view of another embodiment of the present invention.

FIG. 8 shows the present invention modified for delayed-action sensing. Insulating walls 841 surround a sensor 811 similar to that in FIG. 7. The insulating walls 841 retard the heat transfer to the sensor. Exposure to out of range temperatures will not activate the sensor 811 unless the exposure lasts long enough to overcome the insulation delay. Delayed activation would be desirable when short term exposure to out of range temperatures, e.g., during proper handling, does not compromise the item but longer term exposure does compromise the item.

The present invention can sense a wide range of temperatures when made with appropriate SMAs. Those skilled in the art know of many suitable SMAs, including Ag-Cd, Au-Cd, Cu-Al-Ni, Cu-Sn, In-Ti, Ni-Al, Ni-Ti, Fe-Mn-Si, Cu-Zn-Al, and Cu-Al-Ni alloys. Nickel-titanium alloys are commonly available. These alloys possess Austenitic temperatures from −200° C. to 110° C. The addition of excess nickel, iron, chromium, and copper to the equiatomic alloy is common to adjust its physical properties (including its Austenitic temperature).

The particular sizes and equipment discussed above are cited merely to illustrate particular embodiments of the invention. It is contemplated that the use of the invention may involve components having different sizes and characteristics as long as the principle, the use of SMAs to provide persistent indication of temperature variations, is followed. It is intended that the scope of the invention be defined by the claims appended hereto.

We claim:

1. A temperature sensor comprising:
   a) an indication surface;
   b) at least one member having a first shape at temperatures below a critical temperature and a second shape at temperatures above the critical temperature, where each member assumes the second shape when the temperature rises above the critical temperature but does not return to the first shape when the temperature falls below the critical temperature;
   c) a plurality of indicators mounted with the members, where the indicators obscure the indication surface when the members are in the first shape, and where the indicators do not obscure the indication surface when the members are in their second shape.

2. The sensor of claim 1, wherein the first shape is a bellows with a first height, and the second shape is the bellows with a second height less than the first height, further comprising a first surface mounted within the bellows and a first covering mounted with the bellows, where the first covering obscures the first surface when the bellows is at its first height and does not obscure the first surface when the bellows is at its second height.

3. The sensor of claim 1 wherein the first shape is a coil with a first height, and the second shape is the coil with a second height less than the first height, further comprising a first surface mounted within the coil and a first covering mounted with the coil, where the first covering obscures the first surface when the coil is at its first height and does not obscure the first surface when the coil is at its second height.

4. The system of claim 1 wherein the first shape is substantially planar and the second shape is nonplanar, further comprising a first surface readily distinguishable from a surface of the member facing an observer, where the at least one member in its planar shape obscures the first surface and the at least one member in its nonplanar shape does not obscure the first surface.

5. The sensor of claim 1, further comprising a base and wherein the indicator is mounted with an axis on the base, and
   a) wherein the at least one member has a first end mounted with the indicator at a first point at a positive distance from the axis and a second end mounted with the base at a second point not colinear with the axis and the first point, and
   b) wherein the first and second ends are separated by a first distance when the at least one member is in its first shape, and by a second distance not equal to the first distance when the at least one member is in its second shape, so that the indicator is at a first rotational position relative to the base when the at least one member is in its first shape and at a different rotational position relative to the base when the at least one member is in its second shape.

6. The sensor of claim 1, further comprising a base and wherein the indicator is mounted with an axis on the base, and
   a) wherein the at least one member has a first end fixably mounted with the indicator at a first point at the axis and a second end fixably mounted with the base at the axis, and
   b) wherein the ends have a first relative rotation when the at least one member is in its first shape, and a second relative rotation not equal to the first relative rotation when the at least one member is in its second shape, so that the indicator is at a first rotational position relative to the base when the at least one member is in its first shape and at a different rotational position relative to the base when the at least one member is in its second shape.

7. The sensor of claim 1 wherein the members are formed of shape memory alloys.

8. The sensor of claim 2, further comprising insulating means for delaying heat transfer to the member.

9. The sensor of claim 3, further comprising insulating means for delaying heat transfer to the member.

10. The sensor of claim 4, further comprising insulating means for delaying heat transfer to the member.

11. The sensor of claim 5, further comprising insulating means for delaying heat transfer to the member.

12. The sensor of claim 6, further comprising insulating means for delaying heat transfer to the member.

13. The sensor of claim 1, further comprising insulating means for delaying heat transfer to the members.

14. The sensor of claim 7, further comprising insulating means for delaying heat transfer to the members.

* * * * *